Patented Dec. 2, 1941

2,264,376

UNITED STATES PATENT OFFICE 2,264,376

PREPARATION OF METHACRYLIC POLYMER MOLDING MATERIAL

James R. Hiltner, Morrisville, and Willard F. Bartoe, Hulmeville, Pa., assignors to Röhm & Haas Company, Philadelphia, Pa.

No Drawing. Application September 30, 1939, Serial No. 297,274

10 Claims. (Cl. 260—83)

This invention relates to the preparation of a methyl or ethyl methacrylate molding powder that is free of "elastic memory."

It is known that polymerized methyl and ethyl methacrylate are relatively hard, thermoplastic resins that may be shaped under heat and pressure into various useful articles. One of the methods proposed for preparing these polymers in a granular form suitable for molding purposes is to agitate the monomeric material in water either in the presence or absence of a small amount of an emulsifying agent and heating the aqueous suspension until polymerization is complete. Numerous other methods have also been proposed, such as casting massive blocks of the materials under conditions which produce a large number of bubbles throughout the block and subsequently grinding the block into a powder or by polymerizing in a solvent for the monomeric material which is a nonsolvent for the polymer. The temperature at which polymerization of the acrylic and methacrylic derivatives in general may be carried out has been variously described as from room temperature to about 130° C. Polymerization at temperatures above about 90° C. has, however, usually been avoided because the polymerization reaction is exothermic and controlling it is very difficult at high temperatures.

Despite knowledge of the various methods of polymerizing methyl and ethyl methacrylate and of the various temperatures at which polymerization may be carried out, no method has heretofore been proposed that results in a satisfactory polymer that is a true plastic as distinguished from an elastic material. The term "elastic material" is herein used in the sense in which it is used in the field of plastics to designate a material which is capable of being molded under heat and pressure but which when reheated to its softening temperature tends to return to its original shape. This phenomenon is usually described as "elastic memory." By the term "true plastic" is meant a thermoplastic material which when shaped under heat and pressure will retain its shape on being again heated unless reshaped by the application of external forces.

The polymeric methyl and ethyl methacrylates prepared by the processes heretofore used have been elastic materials. When prepared in granular form and molded under heat and pressure, clear, transparent molded objects were obtainable but if for any reason the molded objects were again heated, the granular form of the original powder reappeared, the molded object became warped and distorted, and its appearance was destroyed. This property also prevented the industrial utilization of the methyl or ethyl methacrylate polymers in calendering sheets, in extrusion, in injection molding, and in all methods of shaping it which did not provide for cooling before the forming pressure was removed.

The object of the present invention is to provide a pure methyl or ethyl methacrylate polymer which is a true plastic. A related object is to provide a method of accomplishing this. Further objects are to provide a methyl or ethyl methacrylate polymer which may be calendered into sheets, extruded into rods or tubes and injection molded. A still further object is to accomplish the foregoing objects without the addition of harmful materials to the methyl or ethyl methacrylate.

These objects have been attained through the discovery that the elastic properties of methyl and ethyl methacrylate are substantially influenced by the method of polymerization, the temperature of polymerization, the presence of small amounts of certain unpolymerized materials, and by milling of the polymer. Of these various factors which affect the elastic properties of the polymer, the first two mentioned appear to have the greatest influence. It has been found that the elastic memory of the polymers can be reduced to a point where a satisfactory injection molding material results by polymerizing the monomeric material in the presence of water at a temperature of from about 100 to 120° C. A still further improvement can be obtained by the addition of certain unpolymerizable materials hereinafter described, to the monomer or by milling the polymer or by both in which cases a satisfactory product is obtainable at somewhat lower polymerization temperatures; namely, from about 95 to 120° C. This discovery we have also found is applicable to the other methacrylic esters which produce hard polymers such as the propyl, isopropyl, butyl, and secondary and tertiary butyl methacrylates; and to copolymers of the methacrylic esters with other polymerizable compounds such as the acrylic and methacrylic esters, nitriles, etc., and mono vinyl compounds, as for instance, vinyl acetate and styrene.

In carrying out the invention the monomeric methacrylic ester or mixture of monomeric methacrylic ester with another polymerizable compound may be suspended in water by any convenient means such as by continuously agitating it in water which may or may not contain emulsifying agents or other material such as filler and while so suspended heating to the desired temperature. Since the temperature of polymerization is above the boiling point of the reaction mixture, it is necessary to conduct the polymerization under pressure. Preferably, a polymerization accelerator is added in small amounts and when this is done the polymerization is complete in from 30 to 120 minutes. The reaction mixture is thereafter cooled and the solid polymer phase separated from the aqueous phase.

When using this method of polymerization, it is desirable to discontinue external heating when the reaction mixture is still from 5 to 10 degrees below the desired temperature of polymerization. The exothermic heat of reaction will cause the temperature to rise the additional 5 or 10 degrees and thereafter cooling means, either internal or external, may be applied to prevent a further increase. Unless this precaution is taken the reaction may become very violent.

Alternatively, the polymerization may be carried out by forcing the monomeric material or a partially polymerized material through a nozzle into a flowing stream of water heated to the desired temperature. In this way the monomer or partial polymer is very rapidly brought to the desired polymerization temperature and after a very short flow the stream may be cooled and passed through a larger container in which its speed of flow is reduced and the polymer allowed to settle.

A third method of carrying out the process is to slowly add the monomeric material or partial polymer to a body of water which has been heated to the desired temperature and is being vigorously agitated. This method likewise produces fairly rapid polymerization. On cooling and stopping the agitation the polymer settles out as shreds.

When the unpolymerizable compounds which affect the plasticity of the polymer are also used, they may be added to the monomeric material or in some cases to the water. A large number of chemically unrelated compounds have been found to have this effect. It may be said of all such compounds, however, that they have the common property of reducing the chain length of the polymeric molecule when present in very low concentrations during polymerization. Whether a compound has this property and therefore, whether it may be used in practicing the present invention may be determined by a simple test comparing the viscosity of solutions of polymers made under identical conditions of polymerization, excepting the presence of the compound being tested in one of the samples to be compared. In making this test it is not necessary to follow the conditions of polymerization prescribed herein. Conveniently, the polymerization may be carried out in the presence of a solvent for the monomeric and polymeric material as for instance, by forming a solution of monomer and polymerization accelerator in a solvent, separating the solution into two portions, adding the compound being tested to one portion in an amount equal to about 1% of the polymerizable material therein, and then polymerizing the two under identical conditions. If the compound being tested has the property of reducing the chain length of the polymeric molecule, the portion to which it was added will have a lower viscosity than the portion to which no addition was made. Other methods of conducting the test may be used so long as the conditions of polymerization, the solvent used to form the solution of polymer, and the concentration of polymer in the solution are identical.

Among the more effective of the various compounds that have been tested to determine their value in reducing the elasticity of methacrylate polymers may be mentioned potassium and barium phenanthrene-2-sulfonate, sodium-p-chlorophenol sulfonate, sodium-o-nitro phenyl sulfonate, dinitro naphthol sulfonic acid, thio salicylic acid, thiourea, p-toluene sulfonamide or chloride, ethyl crotonate, phthalic anhydride, sulfonyl dichloride, acetamide, and methallyl chloride. While the quantity of these compounds that should be used to obtain optimum results varies with each individual compound, some of them are very effective when present in very low concentrations, as for instance, as low as 0.05% based on the weight of the polymer. With others the best results are obtained when about 1% is used. The invention does not contemplate the use of compounds which must be used in amounts greater than about 3% based on the weight of the polymer. These materials, it has also been found, reduce the elasticity of methacrylate polymers when other conditions of polymerization are used, as for instance, when lower polymerization temperatures are used in either the so-called emulsion polymerization method or in casting of sheets, rods or tubes under controlled conditions which prevent bubble formation. Instead of adding them to the polymerization mixture prior to polymerization, they may, if the polymer is to be milled, be added on the rolls and milled into the polymer whereby there is also obtained a substantial reduction in the elasticity of the polymer. This is particularly true when the conventional polymerization methods are used but applies also when the polymerization method herein described is used.

Finally, it has been found that milling the polymer obtained by the polymerization method herein described, either with or without the addition of compounds that reduce the chain length of the polymeric molecule, further improves the plasticity of the polymer. Whereas a very satisfactory injection molding material may be prepared by merely polymerizing in the presence of water at the temperatures heretofore given, a still better one is obtained if the polymer is thereafter milled on heated rolls or otherwise masticated by mechanical working. In this step the mill rolls are preferably heated to a temperature range of from about 100° C. to about 160° C. and the milling continued until a homogeneous mass is obtained. For the production of injection molding material the milled polymer is ground into particles of appropriate size. Particles which will pass through a $\frac{5}{16}''$ mesh screen are of appropriate size for the injection molding presses of present day design.

To illustrate the invention the following examples are given.

*Example 1.*—4700 parts of water containing about 1 part of sodium lauryl sulfate, 12.5 parts sodium polyacrylate and 38 parts of sodium sulfate was placed in an autoclave equipped with a stirrer and surrounded by a heating jacket. 1400 parts of monomeric methyl methacrylate containing 15 parts of stearic acid and 7.5 parts of benzoyl peroxide was added and the stirrer started. Hot water was then circulated through the heating jacket until the temperature rose to 95° C. Thereafter the temperature of the water circulating in the jacket was reduced and regulated to carry away the heat of reaction while maintaining the reaction mixture at from 100 to 130° C. After approximately 45 minutes the temperature was reduced to approximately room temperature and the reaction mixture discharged from the autoclave. The polymer settles out as small spheres if the stirring has not been too vigorous. A vigorous stirring gives an emulsion of polymer which may be broken by the addition of acid. The polymer has substantially less elastic memory than a polymer made under similar conditions at 85° C. Its elastic memory is still further reduced by milling on a rubber mill having its rolls heated to from 100° C. to 160° C. The milled polymer after cooling may be ground into particles of appropriate size for extrusion or injection molding and is very satisfactory for this purpose.

Example 2.—A reaction mixture of composition identical with that used in Example 1 was charged into the same autoclave. Hot water was circulated through the heating jacket until the temperature reached approximately 100° C. and thereafter its temperature reduced to maintain the reaction mixture at a temperature of from 109° C. to 111° C. The pressure in the autoclave reached about 23 lbs. per sq. in. After thirty minutes at this temperature the reaction mixture was cooled and the polymer separated from the aqueous phase. Its plasticity both before and after milling was respectively better than the plasticity of the polymer obtained in Example 1, before and after milling.

In place of using methyl methacrylate in each of the foregoing examples, ethyl methacrylate may be used. Similarly, the methyl methacrylate may be replaced by mixtures of methyl or ethyl methacrylate and from 0.5 to 25% of methyl or ethyl acrylate, vinyl acetate, acrylonitrile, styrene, etc. The copolymers thus obtained from mixtures of methyl methacrylate and an acrylic acid ester of a lower aliphatic alcohol, i. e. an alcohol containing up to five carbon atoms, are particularly good injection molding materials. Especially good are the copolymers made in this way from methyl methacrylate and ethyl acrylate.

Example 3.—4700 parts of water containing about 12.5 parts of sodium polyacrylate and 28 parts of anhydrous disodium phosphate was placed in the autoclave used in Example 1 and to it was added 1450 parts of a mixture composed of approximately 85% methyl methacrylate and 15% ethyl acrylate, and also containing 30 parts of stearic acid, 15 parts of benzoyl peroxide and 3 parts of ethyl crotonate. The pressure in the autoclave was maintained constant at 30 lbs. per sq. in. by means of nitrogen. Hot water was circulated in the heated jacket until the temperature of the reaction mixture reached approximately 100° C. The temperature was thereafter allowed to rise to approximately 111° C. and maintained there by the addition of cold water to the reaction mixture. After about 30 minutes the reaction mixture was cooled and discharged from the autoclave. Its plasticity was excellent and after being milled on rolls heated to 100° C. and then ground to particles of appropriate size, gave an injection molding material of superior quality.

The ethyl crotonate used in this example may be replaced by any of the other materials heretofore mentioned that reduce the chain length of the polymeric molecule.

The foregoing examples have been given only as an illustration of one method of carrying out the invention. Other temperatures within the range heretofore given and other methods of forming an aqueous suspension during polymerization may be substituted for those given in the illustrations. Other variations such as are commonly used in the polymerization of methacrylic resins and which are susceptible to being used in the emulsion method of polymerization may be made in the process herein disclosed. If, for instance, an opaque polymer is desired, a material which is soluble in the monomer but incompatible with the polymer, such as polystyrene, may be dissolved in the monomer prior to polymerization. The lubricant, stearic acid, used in these examples may be replaced by other appropriate lubricants or omitted altogether.

The products made in accordance with the invention may be used for all the purposes for which the methacrylic resins are known to be useful. In addition, they may be calendered into sheets, extruded into rods and tubes and injection molded. When formed by any of these means or by normal compression molding, the polymer retains permanently the shape imparted to it and will not warp or otherwise change in appearance unless subjected to external forces sufficient to alter the given shape.

We claim:

1. The process of producing a methacrylic resin substantially free of elastic memory which comprises suspending a monomeric member of the group consisting of methyl methacrylate and ethyl methacrylate in an aqueous medium and maintaining the suspension under pressure at a temperature of from 100° C. to 120° C. until polymerization is complete.

2. The process of producing a methacrylic resin substantially free of elastic memory which comprises suspending a monomeric member of the group consisting of methyl methacrylate and ethyl methacrylate in an aqueous medium, heating said suspension under pressure until a temperature of from 85 to 110° C. is reached, thereafter absorbing the excess heat of polymerization to maintain the temperature between 100 and 120° C. until polymerization is complete, separating the polymer from the aqueous phase, mechanically masticating it until a homogeneous mass is obtained.

3. The process of producing a methacrylic resin molding powder adapted for injection molding which comprises suspending a monomeric member of the group consisting of methyl methacrylate and ethyl methacrylate in an aqueous medium and maintaining the suspension at a temperature of from 100 to 120° C. until polymerization is complete, separating the polymer from the aqueous phase, mechanically masticating it until a homogeneous mass is obtained and grinding the mass to an appropriate particle size.

4. The process of producing a methyl methacrylate resin substantially free of elastic memory which comprises suspending monomeric methyl methacrylate in water, heating the suspension, and maintaining it at a temperature of from 100° C. to 120° C. until polymerization is complete.

5. The process of producing a methyl methacrylate resin substantially free of elastic memory which comprises suspending monomeric methyl methacrylate in water, heating the suspension and maintaining it at a temperature of from 100 to 120° C. until polymerization is complete, separating the polymer from the water and mechanically masticating it on heated rolls until a homogeneous mass is obtained.

6. The process of producing a methyl methacrylate resin substantially free of elastic memory which comprises suspending monomeric methyl methacrylate in water, heating the suspension to a temperature of from 90° to 110° C. and thereafter maintaining the suspension at from 100° to 120° C. by cooling means regulated to absorb the excess heat of reaction.

7. The process of producing a methyl methacrylate resin substantially free of elastic memory which comprises suspending monomeric methyl methacrylate in water, heating the suspension to a temperature of 90 to 110° C., thereafter absorbing the excess heat of polymerization to maintain the temperature between 100 and 120° C. until polymerization is complete, cooling the suspension, separating the polymer from the water and mechanically masticating it on heated rolls until a homogeneous mass is obtained.

8. The process of producing a methyl methacrylate resin adapted for injection molding which comprises suspending monomeric methyl methacrylate in water, heating the suspension to approximately 100° C., thereafter absorbing the excess heat of polymerization to maintain the temperature at approximately 110° C. until polymerization is complete, separating the polymer from the water, mechanically masticating the polymer until a homogenous mass is obtained, and grinding the mass to an appropriate particle size.

9. The process of producing a methyl methacrylate resin substantially free of elastic memory which comprises suspending a mixture containing monomeric methyl methacrylate and from 0.5 to 25% monomeric acrylic acid ester of an aliphatic alcohol containing up to five carbon atoms in water, heating the suspension to a temperature of from 90° to 110° C., and thereafter maintaining the suspension at about 100° to 120° C. by cooling means regulated to absorb the excess heat of reaction.

10. The process of producing a methyl methacrylate resin substantially free of elastic memory which comprises suspending in an aqueous medium a mixture containing monomeric methyl methacrylate, from 0.5 to 25% monomeric ethyl acrylate, and from 0.05 to 3% of methallyl chloride, heating the suspension to approximately 100° C., and thereafter maintaining it at approximately 110° C. by cooling means regulated to absorb the excess heat of reaction, cooling said suspension, separating the polymer from the aqueous phase, and mechanically masticating it on heated rolls until a homogeneous mass is obtained.

JAMES R. HILTNER.
WILLARD F. BARTOE.